US012608836B2

(12) United States Patent
Srivastava et al.

(10) Patent No.: US 12,608,836 B2
(45) Date of Patent: Apr. 21, 2026

(54) VIDEO ENGAGEMENT DETERMINATION BASED ON STATISTICAL POSITIONAL OBJECT TRACKING

(71) Applicant: SONY GROUP CORPORATION, Tokyo (JP)

(72) Inventors: Anubhav Srivastava, Bengaluru (IN); Chinmay Bharadwaj, Bengaluru (IN); Gopinath Ramananda, Bengaluru (IN); Sabyasachi Paul, Bengaluru (IN); Mahima Rao K, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 343 days.

(21) Appl. No.: 18/348,333

(22) Filed: Jul. 6, 2023

(65) Prior Publication Data

US 2025/0014204 A1      Jan. 9, 2025

(51) Int. Cl.
| | |
|---|---|
| *G06K 9/00* | (2022.01) |
| *G06F 3/01* | (2006.01) |
| *G06T 7/11* | (2017.01) |
| *G06T 7/70* | (2017.01) |
| *G06V 10/82* | (2022.01) |
| *G06V 40/18* | (2022.01) |

(Continued)

(52) U.S. Cl.
CPC ................ *G06T 7/70* (2017.01); *G06F 3/013* (2013.01); *G06T 7/11* (2017.01); *G06V 10/82* (2022.01); *G06V 40/193* (2022.01); *G10L 17/00* (2013.01); *H04N 21/2187* (2013.01); *G06T 2207/30196* (2013.01); *G06V 2201/07* (2022.01)

(58) Field of Classification Search
CPC ........ G06F 3/013; G06N 3/045; G06V 10/82; G06V 20/40; G06V 2201/07; G06V 40/10; G06V 40/18; G06V 40/193
See application file for complete search history.

(56) References Cited

U.S. PATENT DOCUMENTS

| | | | |
|---|---|---|---|
| 8,564,660 B2 | 10/2013 | Weatherhead | |
| 10,506,284 B2 | 12/2019 | Ho et al. | |
| 11,681,364 B1 | 6/2023 | Zhang | |

(Continued)

OTHER PUBLICATIONS

Modi, et al., "Real-time camera-based eye gaze tracking using convolutional neural network: a case study on social media website", Springer, Virtual Reality, Mar. 30, 2022, 19 pages.

*Primary Examiner* — Hadi Akhavannik
(74) *Attorney, Agent, or Firm* — CHIP LAW GROUP

(57)      ABSTRACT

An electronic device and method for video engagement determination based on statistical positional object tracking is provided. The electronic device receives media content including a set of video frames based on a content playability factor and detects a set of objects included in each video frame based on an application of a first NN model on each video frame. The electronic device receives a set of images of an audience watching the media content. The electronic device estimates gaze co-ordinates associated with the audience based on an application of a second NN model on each image. The electronic device splits each video frame into a set of segments and maps the gaze co-ordinates to the set of segments. The electronic device determines an engagement score for each object based on the mapping of the gaze co-ordinates and renders the engagement score on a display device.

20 Claims, 5 Drawing Sheets

(51) Int. Cl.
   *G10L 17/00*          (2013.01)
   *H04N 21/2187*      (2011.01)

(56)                    References Cited

U.S. PATENT DOCUMENTS

| | | | |
|---|---|---|---|
| 2015/0088515 A1* | 3/2015 | Beaumont | G10L 17/06 |
| | | | 704/251 |
| 2018/0191952 A1* | 7/2018 | Ardo | G06F 3/013 |
| 2018/0268240 A1* | 9/2018 | Loce | G06F 21/6254 |
| 2018/0300751 A1* | 10/2018 | Hammitt | G06V 30/19173 |
| 2020/0267427 A1 | 8/2020 | Rogers | |
| 2021/0264921 A1* | 8/2021 | Reece | G06F 40/35 |
| 2022/0230469 A1* | 7/2022 | Kimhi | G06V 40/16 |
| 2022/0236797 A1 | 7/2022 | Drozdov | |
| 2022/0292284 A1 | 9/2022 | Hoffman | |

* cited by examiner

300

VIDEO ENGAGEMENT DETERMINATION BASED ON STATISTICAL POSITIONAL OBJECT TRACKING

CROSS-REFERENCE TO RELATED APPLICATIONS/INCORPORATION BY REFERENCE

None.

FIELD

Various embodiments of the disclosure relate to metadata tagging of digital multimedia. More specifically, various embodiments of the disclosure relate to video engagement determination based on statistical positional object tracking.

BACKGROUND

Advancements in the field of information management systems have led to the development of various media manipulation tools, which may be integrated in multimedia rendering software and web-based applications. The tools have allowed users to manually tag multimedia content rendered by the multimedia rendering software or the web-based applications. The multimedia content may be tagged using keywords, text, images, or any other identification markers, for classification or categorization of information or objects that may be associated with, or included in, the multimedia content. Such tagging may enable users of file-sharing applications, social media applications, bookmarking applications, and so on, to create and assign one or more tags (for example, keywords, text, or labels) to the multimedia content (such as a video or an image). The multimedia content may be searched for, or identified, at a later point in time based on the assigned one or more tags. However, it may be challenging to select items of information (included in or associated with the multimedia content) to be used for assignment of tags to the multimedia content and it may also be difficult to ensure a consistency in the selection. Manually tagging the multimedia content may be costly, laborious, time-consuming, and error prone. Such challenges may endanger the scope for retrieving the multimedia content in the future and may lead to potential loss of digital assets (such as, the multimedia content).

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for video engagement determination based on statistical positional object tracking, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
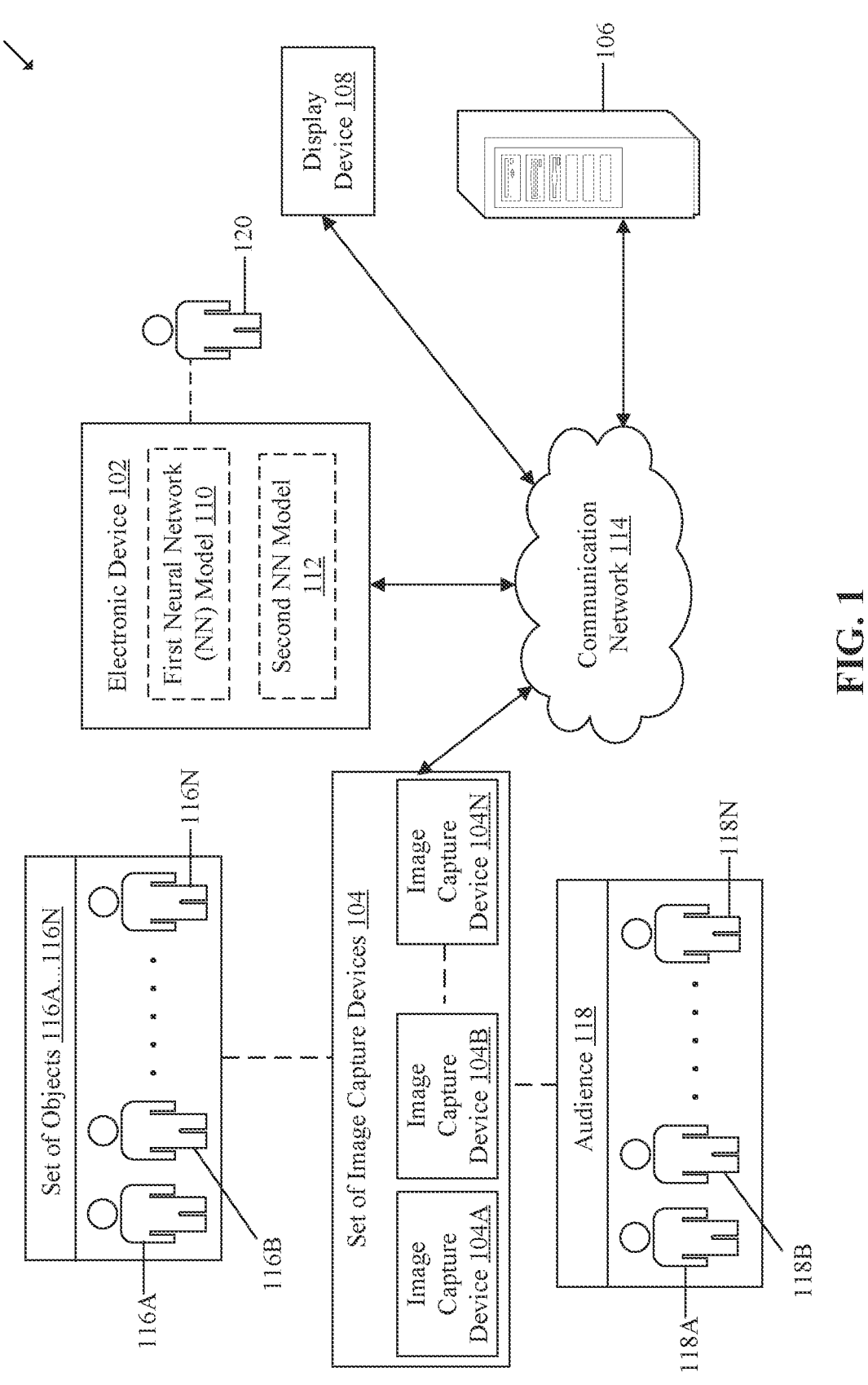
FIG. 1 is a diagram that illustrates an exemplary network environment for video engagement determination based on statistical positional object tracking, in accordance with an embodiment of the disclosure.

The following described implementations may be found in a disclosed electronic device and method for video engagement determination based on statistical positional object tracking. Exemplary aspects of the disclosure provide an electronic device (for example, a computing device, a server, or a mainframe computer) that may receive media content that may include a set of video frames based on a content playability factor. The electronic device may apply a first neural network (NN) model on each video frame of the set of video frames. The electronic device may detect a set of objects (such as a human character, an animated character, or an inanimate object), which may be included in each video frame of the set of video frames. The detection of the set of objects may be based on the application of the first NN model on each video frame of the set of video frames. The electronic device may capture or receive a set of images of an audience that may be watching the received media content. The electronic device may apply a second NN model on each image of the captured (or received) set of images of the audience. Thereafter, the electronic device may estimate gaze co-ordinates associated with the audience based on the application of the second NN model on each image of the captured (or received) set of images. The electronic device may split each video frame of the set of video frames into a set of segments. Thereafter, the electronic device may map the estimated gaze co-ordinates to the set of segments of each video frame of the set of video frames. The electronic device may determine an engagement score for each object of the detected set of objects based on the mapping of the estimated gaze co-ordinates to the set of segments. The electronic device may render, on a display device, the determined engagement score for each object of the detected set of objects.

Typically, multimedia content, such as a video, may be tagged using metadata associated with the video. The metadata may include a format, an audio bitrate, a video bitrate, a frame rate, a resolution, a duration, a stream size, and so on. Based on the metadata, tags may be generated and, thereafter, assigned to the video to enable users to query the video at a future time-instant. The video may be returned as a search result corresponding to a query associated with one or more metadata tags assigned to the video. Such metadata tagging may enable classification of content included in the video based on the tagged metadata and may facilitate the users to determine the content included in the video without viewing the video, fully or partially. However, metadata tagging of multimedia content may present itself with its unique set of challenges such as to standardize a creation of metadata tags that may be assigned to the multimedia content, to ensure a consistency in selection of metadata to be used for tagging the multimedia content, and to maintain an accuracy in assignment of the created metadata tags. To overcome the abovementioned challenges, it may be paramount to ensure a retrievability of the multimedia content. In some scenarios, to overcome the challenges, metadata tags may be manually assigned to the multimedia content. However, manual metadata tagging may be laborious, error-prone, necessitate employing human labor, cost-ineffective, and time consuming.

To address the abovementioned issues, the proposed electronic device may be configured to leverage artificial intelligence (AI) for generation of metadata tags that may be associated with multimedia content (such as a video). The generation of the metadata may be based on determination of scene content (such as objects) of the video and gaze data associated with an audience who may be watching the scene content. For example, the electronic device may receive a video based on a playability factor associated with the video, and, subsequently, detect objects (such as human characters and/or inanimate objects) that may be rendered in a set of frames of the video. The detection of the objects may be based on an application of a machine learning (ML) model (such as a neural network model) on a set of frames of the video. The electronic device may further receive a set of images of an audience who may be watching content that may be included in the received video. The set of images may be fed as an input to another ML model for prediction of gaze positions associated with a set of spectators in the audience. The gaze positions may be determined based on a head pose, an iris position, and a distance between a corresponding spectator of the set of spectators and the detected set of objects. The predicted gaze positions (such as, gaze coordinates) may correspond to positions of the detected objects in each frame of the set of frames of the video. The electronic device may determine the correspondence between the gaze positions and the positions of the detected objects. Based on the determination, an engagement score for each of the detected objects in each frame of the set of frames may be determined. The engagement score may be indicative of a strength of the corresponding object to catch an attention of the audience towards the corresponding object rendered in a corresponding frame of the video. The determined engagement scores determined for the set of objects in the set of frames may be used for one or more of metadata tagging via assignment of metadata tags to the video, rating content depicted in the video, in-video advertising for brand endorsement, and so on.

FIG. 1 is a diagram that illustrates an exemplary network environment for video engagement determination based on statistical positional object tracking, in accordance with an embodiment of the disclosure. With reference to FIG. 1, there is shown a network environment 100. The network environment 100 may include an electronic device 102, a set of image capture devices 104A . . . 104N, a server 106, and a display device 108. The electronic device 102 may include a first neural network (NN) model 110 and a second NN model 112. The electronic device 102 may be configured to communicate with the set of image capture devices 104A . . . 104N, the server 106, and the display device 108, through one or more communication networks (such as a communication network 114). The electronic device 102 may receive multimedia content that may depict a set of objects 116A . . . 116N. The electronic device 102 may further receive images of an audience 118 that may include a set of spectators 118A . . . 118N. There is further shown a user 120 who may be a user or an owner of the electronic device 102 or the display device 108.

The electronic device 102 may include suitable logic, circuitry, interfaces, and/or code that may be configured to leverage machine learning for identification or detection of the set of objects 116A . . . 116N rendered in frames of multimedia content (for example, the video) and determination of a strength of each object of the detected set of objects 116A . . . 116N. The strength of each object may be determined based on gaze direction or position of the audience 118 on the detected set of objects 116A . . . 116N when the audience 118 views the video. The determined strength of an object may be indicative of an engagement of the audience 118 with the corresponding object. The determined strength may be used as a metadata tag and may be assigned to the video. Examples of the electronic device 102 may include, but are not limited to, a computing device, a tablet, a smartphone, a laptop, a mainframe machine, a computer workstation, a server, an internet of things (IoT) device, and/or any consumer electronic (CE) device.

The set of image capture devices 104A . . . 104N may include suitable logic, circuitry, interfaces, and/or code that may be configured to receive control instructions, from the electronic device 102, to capture a set of images of the audience 118. The set of image capture devices 104A . . . 104N may capture the set of images from multiple viewpoints. The set of image capture devices 104A . . . 104N may be controlled (by the electronic device 102), via the control instructions, to transmit the set of images to the electronic device 102. In some embodiments, the control instructions may instruct the set of image capture devices 104A . . . 104N to capture a video of a stage or a theater where a set of human characters may be performing. The set of human characters may represent the set of objects 116A . . . 116N. The control instructions may further instruct the set of image capture devices 104A . . . 104N to transmit the video of the stage/theater to the electronic device 102. Examples of the set of image capture devices 104A . . . 104N may include, but are not limited to, an image sensor, a wide-angle camera, an action camera, a closed-circuit television (CCTV) camera, a camcorder, a digital camera, a camera phone, or a night-vision camera.

The server 106 may include suitable logic, circuitry, interfaces, and/or code that may be configured to store neural network models, such as the first NN model 110 and the second NN model 112. The server 106 may be configured to receive a request from the electronic device 102 to retrieve the first NN model 110 and the second NN model 112. The server 106 may transmit the first NN model 110 and the second NN model 112 to the electronic device 102 based the received request. In some embodiments, the server 106 may receive, from the electronic device 102, multimedia content (such as a video that may depict the set of objects 116A . . . 116N) and a set of images of the audience 118. The server 106 may use the first NN model 110 to detect the set of objects 116A . . . 116N in a set of frames of the video and use the second NN model 112 to estimate gaze coordinates associated with the audience 118 on the detected set of objects 116A . . . 116N based on a playability factor. Thereafter, the server 106 may transmit results (i.e., outputs) of the first NN model 110 and the second NN model 112 to the electronic device 102.

The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, or a combination thereof. In at least one embodiment, the server 106 may be implemented as a plurality of distributed cloud-based resources by use of several technologies that are well known to those ordinarily skilled in the art.

A person with ordinary skill in the art will understand that the scope of the disclosure may not be limited to the implementation of the server 106 and the electronic device 102 as two separate entities. In certain embodiments, the functionalities of the server 106 can be incorporated in its entirety or at least partially in the electronic device 102, without a departure from the scope of the disclosure.

The display device 108 may include suitable logic, circuitry, interfaces, and/or code that may be configured to receive control instructions from the electronic device 102. Based on the control instructions, the display device 108 may render multimedia content (such as a set of video frames), object detection results (such identification of the set of objects 116A . . . 116N as human characters, animate characters, and inanimate objects), a set of images (captured by the set of image capture devices 104A . . . 104N) of the audience 118, and engagement scores that may be obtained for each object of the set of objects 116A . . . 116N. In some embodiments, the functionality of the display device 108 may be partially, or completely, incorporated in the electronic device 102, without a deviation from the scope of the disclosure. The display device 108 may be realized through various known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 108 may refer to a display screen of a head mounted device (HMD), a smart-glass device, a see-through display, a projection-based display, an electro-chromic display, or a transparent display.

Each of the first NN model 110 and the second NN model 112 may be a computational network or a system of artificial neurons that may be typically arranged in a plurality of layers. Each of the first NN model 110 and the second NN model 112 may be defined by its hyper-parameters, for example, activation function(s), a number of weights, a cost function, a regularization function, an input size, a number of layers, and the like. Further, The layers may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of each of the first NN model 110 and the second NN model 112. Outputs of each hidden layer may be coupled to inputs of at least one node in other layers of each of the first NN model 110 and the second NN model 112. Node(s) in the final layer may receive inputs from at least one hidden layer to output a result. The number of layers and the number of nodes in each layer may be determined from the hyper-parameters of each of the first NN model 110 and the second NN model 112. Such hyper-parameters may be set before, while training, or after training each of the first NN model 110 and the second NN model 112 on a training dataset.

Each node may correspond to a mathematical function (e.g., a sigmoid function or a rectified linear unit) with parameters that are tunable during training of each of the first NN model 110 and the second NN model 112. The set of parameters may include, for example, a weight parameter, a regularization parameter, and the like. Each node may use the mathematical function to compute an output based on one or more inputs from nodes in other layer(s) (e.g., previous layer(s)) of each of the first NN model 110 and the second NN model 112. All or some of the nodes of each of the first NN model 110 and the second NN model 112 may correspond to same or a different mathematical function. In training of each of the first NN model 110 and the second NN model 112, one or more parameters of each node of each of the first NN model 110 and the second NN model 112 may be updated based on whether output of the final layer for a given input (from the training dataset) matches a correct result in accordance with a loss function for each of the first NN model 110 and the second NN model 112. The above process may be repeated for same or a different input until a minima of the loss function is achieved, and a training error is minimized. Several methods for training are known in art, for example, gradient descent, stochastic gradient descent, batch gradient descent, gradient boost, meta-heuristics, and the like.

Each of the first NN model 110 and the second NN model 112 may include electronic data, which may be implemented as, for example, a software component of an application executable on the electronic device 102. Each of the first NN model 110 and the second NN model 112 may rely on libraries, external scripts, or other logic/instructions for execution by a processing device, such as the circuitry 202. In one or more embodiments, each of the first NN model 110 and the second NN model 112 may be implemented using hardware including a processor, a microprocessor (e.g., to perform or control performance of one or more operations), a field-programmable gate array (FPGA), or an application-specific integrated circuit (ASIC). Alternatively, in some embodiments, each of the first NN model 110 and the second NN model 112 may be implemented using a combination of hardware and software. Examples of the first NN model 110 or the second NN model 112 may include, but are not limited to, a deep neural network (DNN), a convolutional neural network (CNN), an artificial neural network (ANN), a fully connected neural network, a deep Bayesian neural network, and/or a combination of such networks. (DNNs). In some embodiments, each of the first NN model 110 and the second NN model 112 may correspond to a learning engine that executes numerical computation techniques using data flow graphs. In certain embodiments, each of the first NN model 110 or the second NN model 112 may be based on a hybrid architecture of multiple DNNs.

The first NN model 110 may be a machine learning model, which may be trained on an object detection task. The first NN model 110 may receive a video as an input and detect or identify a set of objects (for example, the set of objects 116A . . . 116N) as outputs based on an application of the first NN model 110 on a set of frames of the video. The set of objects 116A . . . 116N may be detected as a human character, an animated character, or an inanimate object. The first NN model 110 may further detect interactions between one or more objects of the detected set of objects 116A . . . 116N, identify a detected human character or an animated character as a speaker, identify association of a detected object with another detected object, and so on. The first NN model 110 may be trained to detect personal information associated with the user 120 or any other user.

The second NN model 112 may be a machine learning model, which may be trained to estimate gaze coordinates associated with an audience (for example, the audience 118).

The second NN model 112 may receive a set of images of the audience 118, captured by the set of image capture devices 104A . . . 104N, as an input. Each image of the received set of images may include the set of spectators 118A . . . 118N. Based on an application of the second NN model 112 on each image of the received set of images gaze coordinates associated with each spectator of the set of spectators 118A . . . 118N may be estimated. The gaze coordinates may correspond to a position of a display screen on which the set of video frames may be rendered. An object (of the set of objects 116A . . . 116N) of gaze of a spectator of the set of spectators 118A . . . 118N may be rendered at the position of the display screen. In some scenarios, the gaze coordinates may correspond to a 3D location where the object of gaze may be located. In such scenarios, the audience 118 may be physically viewing the set of objects 116A . . . 116N. The 3D location may be mapped to coordinates within each frame of the set of frames of the video, at which the object of gaze may be estimated.

The communication network 114 may include a communication medium through which the electronic device 102, the set of image capture devices 104A . . . 104N, the server 106, and the display device 108, may communicate with each other. The communication network 114 may be a wired or wireless communication network. Examples of the communication network 114 may include, but are not limited to, Internet, a Wireless Fidelity (Wi-Fi) network, a Personal Area Network (PAN), a Local Area Network (LAN), a cellular network (for example, a $4^{th}$ Generation Long-Term Evolution (LTE) network or a $5^{th}$ Generation New Radio network), a satellite network (for example, including a set of low earth satellites), or a Metropolitan Area Network (MAN). The electronic device 102, the set of image capture devices 104A . . . 104N, the server 106, and the display device 108, may be configured to connect to the communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to receive media content including a set of video frames based on a content playability factor. The content playability factor may indicate whether the set of video frames (i.e., multimedia content) belong to a prerecorded video (for example, a television broadcast or a pre-recorded streaming video) or an instantaneously captured video (or a real-time streaming video) of a stage or a theater (for example, a live event). The electronic device 102 may receive the set of video frames from another electronic device (such as a laptop, a smart phone, a television, or a personal computer) or retrieve the set of video frames from a memory of the electronic device 102, if the set of video frames belong to a prerecorded video. On the other hand, the electronic device 102 may receive the set of video frames from the set of image capture devices 104A . . . 104N if the set of video frames belong a video of the stage or theater. The set of video frames may be instantaneously captured by the set of image capture devices 104A . . . 104N. The capturing of the set of video frames may be based on reception of control instructions from the electronic device 102 to instantaneously capture a video of the stage or theater.

The electronic device 102 may be further configured to apply the first NN model 110 on each video frame of the set of video frames included in the received media content. The first NN model 110 may be applied for determination of scene information associated with content that may be depicted in the set of video frames.

The electronic device 102 may be further configured to detect a set of objects included in each video frame of the set of video frames based on the application of the first NN model 110 on the set of video frames. The set of video frames may depict the set of objects 116A . . . 116N. The first NN model 110 may be trained to detect objects and identify the detected objects as belonging to a class of a set of classes. For example, objects of the set of objects 116A . . . 116N may be identified as belonging to a class of a set of three classes, viz., a human character, an animated character, or an inanimate object. Therefore, based on the application of the first NN model 110, the electronic device 102 may detect a number of objects (in the set of objects 116A . . . 116N) and a class of each detected object depicted in the set of video frames.

The electronic device 102 may be further configured to receive a set of images of the audience 118 watching the received media content. For the reception of the set of images, the electronic device 102 may send control instructions to the set of image capture devices 104A . . . 104N to capture the set of images and transmit the captured set of images to the electronic device 102. The set of image capture devices 104A . . . 104N may capture the set of images from multiple viewpoints such that a direction of gaze of each spectator of the set of spectators 118A . . . 118N (present in the audience 118) may be estimated. Once the set of images are captured, the set of images may be received from the set of image capture devices 104A . . . 104N.

The electronic device 102 may be further configured to apply the second NN model 112 on each image of the received set of images of the audience 118. The second NN model 112 may receive the set of images as an input. The second NN model 112 may be applied on each image of the received set of images of the audience 118 for determination of head pose of each spectator of the set of spectators 118A . . . 118N. The estimation of the gaze coordinates associated with each spectator may be based on the determined head pose of the corresponding spectator.

The electronic device 102 may be further configured to estimate gaze co-ordinates associated with the audience 118 based on the application of the second NN model 112 on the received set of images. The audience 118 may include the set of spectators 118A . . . 118N and the gaze co-ordinates associated with each spectator of the set of spectators 118A . . . 118N may be estimated. The estimation may be based on the playability factor. For example, if the set of objects 116A . . . 116N are human characters performing on a stage during a live event and the audience 118 is physically viewing the human characters on the stage, the estimated gaze coordinates, for each spectator of the set of spectators 118A . . . 118N, may correspond to coordinates of a 3D location in 3D space. On the other hand, if the set of spectators 118A . . . 118N are viewing a display screen, on which the set of video frames depicting the set of objects 116A . . . 116N may be rendered, the estimated gaze coordinates may correspond to coordinates of a 2D location on the display screen. The coordinates of the 3D location or 2D location may correspond to coordinates in the set of video frames where the set of objects 116A . . . 116N may be detected.

The electronic device 102 may be further configured to split each video frame of the set of video frames into a set of segments. The splitting of each video frame may be based on a count of objects of the set of objects 116A . . . 116N that may be likely to be detected in each segment of the set of segment after the splitting of each video frame of the set of set of video frames. Thus, a count of segments in the set of segments may depend on the count of objects detected in each video frame the set of video frames. The splitting may be such that a subset of segments of the set of segments may include one or more objects of the set of objects 116A . . . 116N. Each segment of the set of segments may correspond to a physical region of a physical space (such as, a stage or a theater) or a region of the display screen in which the set of video frames may be rendered.

The electronic device 102 may be further configured to map the estimated gaze co-ordinates to the set of segments of each video frame of the set of video frames. The gaze co-ordinates estimated for each spectator of the set of spectators 118A . . . 118N (in the audience 118) may be mapped to a segment of the set of segments of one or more video frames of the set of video frames. The mapping may be based on the playability factor. For example, gaze co-ordinates, estimated for a spectator of the set of spectators 118A . . . 118N, based on at least one image of the set of images, may correspond to a physical location where a human character (an object of the set of objects 116A . . . 116N) may be performing. The estimated gaze coordinates may be mapped to coordinates that may correspond to a location within a segment of at least one video frame of the set of video frames. The object (i.e., the human character) may be detected at the location within the segment. In another example, the gaze co-ordinates, estimated for the spectator, may correspond to a region of the display screen in which the set of video frames may be rendered. In this scenario, coordinates of the region of the display screen may be mapped to coordinates that correspond to a location, within a segment of at least one video frame of the set of video frames, where the object may be detected.

The electronic device 102 may be further configured to determine an engagement score for each object of the detected set of objects 116A . . . 116N based on the mapping of the estimated gaze co-ordinates to the set of segments. The determined engagement score for each object may be indicative of interest of the audience 118 for a corresponding object. The electronic device 102 may determine an engagement score for the corresponding object in at least one video frame (where the corresponding object may be rendered) of the set of video frames. A higher engagement score, estimated for the corresponding object, may indicate a strong mapping of the gaze coordinates to a segment of the set of segments of the at least one video frame where the corresponding object may be detected (by the first NN model 110). The stronger mapping may indicate that a greater count of spectators of the set of spectators 118A . . . 118N may be engaged to the corresponding object. On the other hand, a lower engagement score may indicate a loose mapping of the gaze coordinates to the segment of the set of segments of the at least one video frame that include the corresponding object.

The electronic device 102 may be further configured to render, on the display device 108, the determined engagement score for each object of the detected set of objects 116A . . . 116N. The rendering of the engagement scores may enable users (such as the user 120) to determine objects of the set of objects 116A . . . 116N, depicted in the set of video frames, on which the audience 118 may be engaged (or interested). The determined engagement scores may be used for creation of metadata tags that may be assigned to the received media content, rate the received media content, or use the media content for in-video advertising for brand endorsements.

Figure 2:
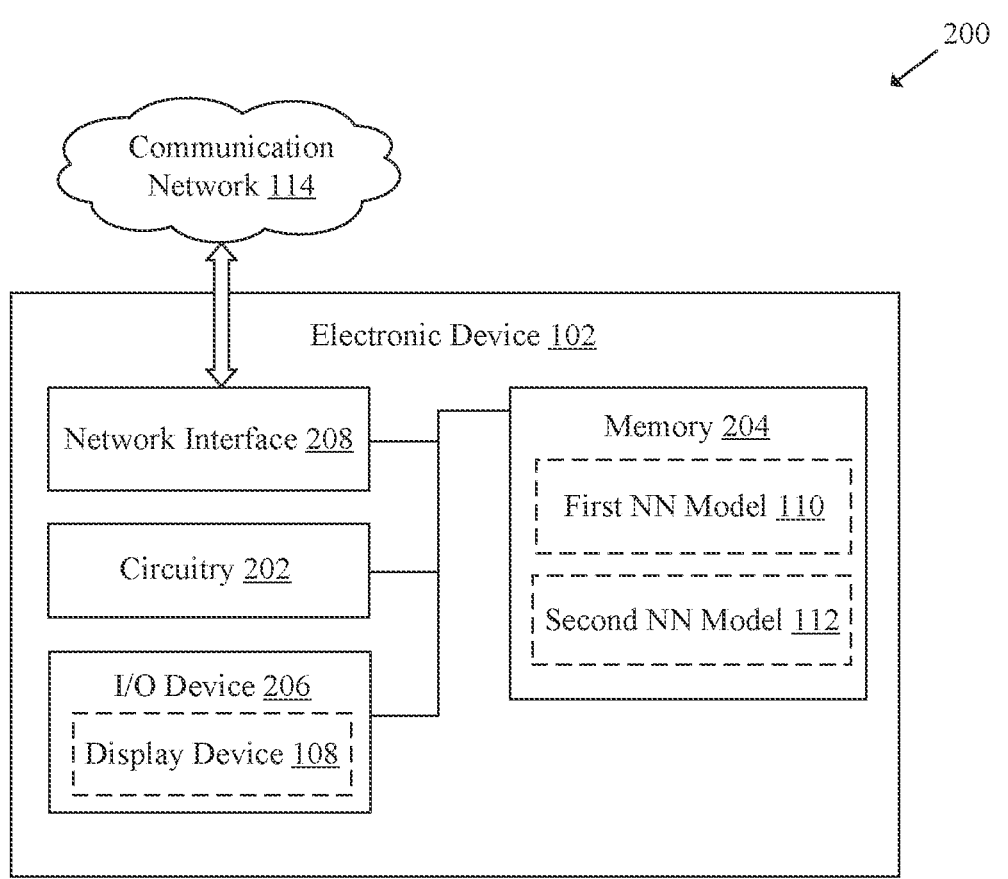
FIG. 2 is a block diagram that illustrates an exemplary electronic device for video engagement determination based on statistical positional object tracking, in accordance with an embodiment of the disclosure.

FIG. 2 is a block diagram that illustrates an exemplary electronic device for video engagement determination based on statistical positional object tracking, in accordance with an embodiment of the disclosure. FIG. 2 is explained in conjunction with elements from FIG. 1. With reference to FIG. 2, there is shown a block diagram 200 of electronic device 102. The electronic device 102 may include circuitry 202, a memory 204, an input/output (I/O) device 206, and a network interface 208. In at least one embodiment, the memory 204 may include the first NN model 110 and the second NN model 112. In at least one embodiment, the I/O device 206 may include the display device 108. The circuitry 202 may be communicatively coupled to the memory 204, the I/O device 206, and the network interface 208, through wired or wireless communication of the electronic device 102.

The circuitry 202 may include suitable logic, circuitry, and interfaces that may be configured to execute program instructions associated with a set of operations to be executed by the electronic device 102. The set of operations may include reception of the media content, application of the first NN model 110, detection of the set of objects 116A . . . 116N, reception of the set of images of the audience 118, and application of the second NN model 112. The set of operations may further include estimation of gaze co-ordinates associated with the audience 118, splitting of each video frame of the set of video frames into a set of segments, mapping of the estimated gaze co-ordinates to the set of segments, determination of the engagement score for each object of the detected set of objects 116A . . . 116N, and rendering of the determined engagement score. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store instructions executable by the circuitry 202. The memory 204 may be configured to store operating systems and associated applications. In at least one embodiment, the memory 204 may be configured to store the first NN model 110, the second NN model 112, the received media content including a set of video frames, and object detection results that may be obtained based on an application of the first NN model 110 on each video frame of the set of video frames. Further, the memory 204 may store the received set of images of the audience 118, the estimated gaze co-ordinates (which may be obtained as output of the second NN model 112), and the engagement score that may be determined for each object of the detected set of objects 116A . . . 116N. Example implementations of the memory 204 may include, but are not limited to, Random Access Memory (RAM), Read Only Memory (ROM), Electrically Erasable Programmable Read- Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive a first user input that may trigger the reception of the media content including the set of video frames, and a second user input that may trigger the reception of the set of images of the audience 118. The I/O device 206 may be further configured to render the determined engagement score for each object of the detected set of objects 116A . . . 116N. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display device 108.

The network interface 208 may include suitable logic, circuitry, interfaces, and/or code that may be configured to establish a communication link between the electronic device 102, the set of image capture devices 104A . . . 104N, the server 106, and the display device 108, via the communication network 114. The network interface 208 may be implemented by use of various known technologies to support wired or wireless communication of the electronic device 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VOIP), light fidelity (Li-Fi), Wi-MAX, a protocol for email, instant messaging, and/or Short Message Service (SMS).

The operations executed by the electronic device 102, as described in FIG. 1, may be performed by the circuitry 202. Operations executed by the circuitry 202 are described in detail, for example, in FIGS. 3 and 4.

Figure 3:
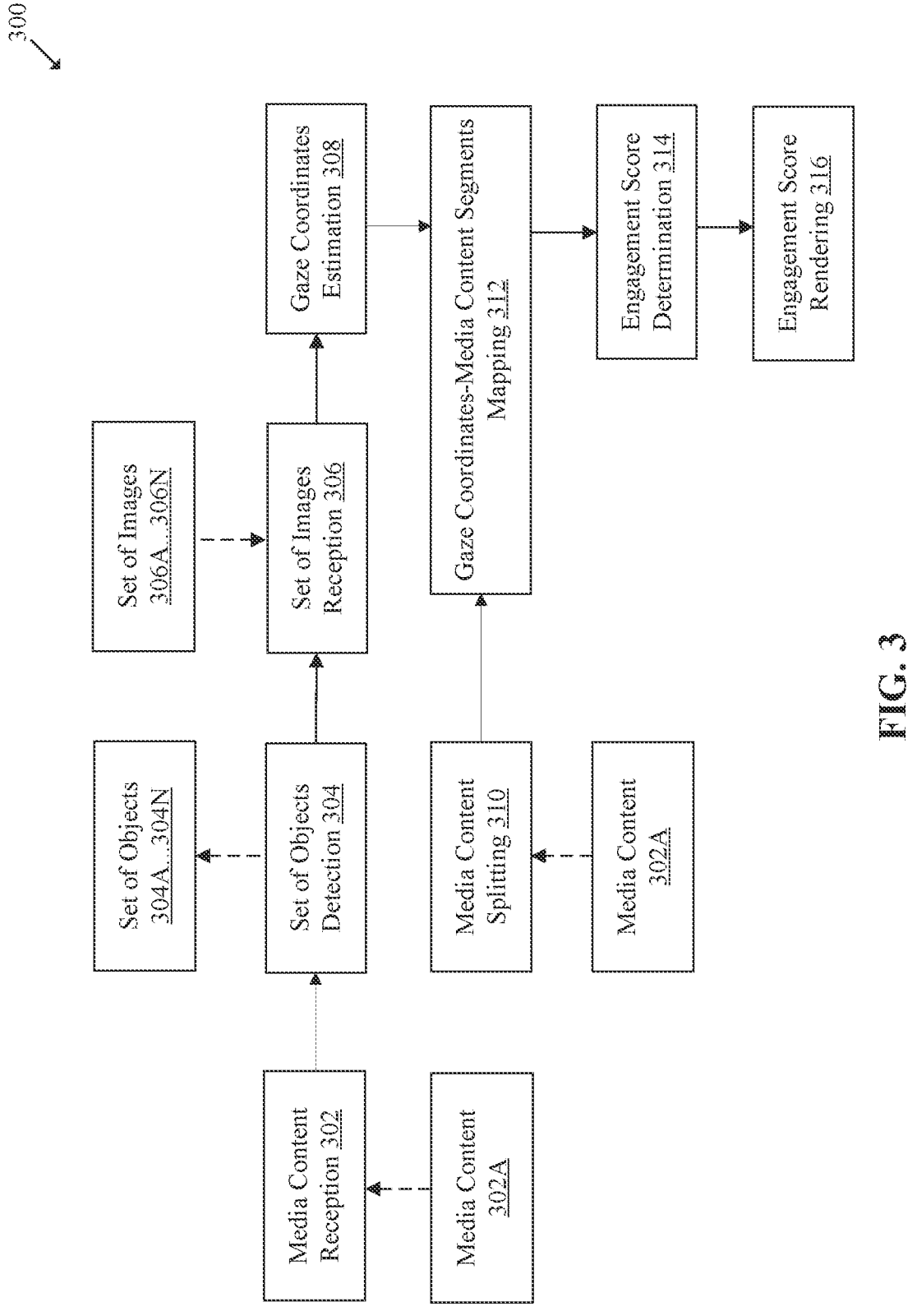
FIG. 3 is a diagram that illustrates an exemplary execution pipeline for video engagement determination based on statistical positional object tracking, in accordance with an embodiment of the disclosure.

FIG. 3 is a diagram that illustrates an exemplary execution pipeline for video engagement determination based on statistical positional object tracking, in accordance with an embodiment of the disclosure. FIG. 3 is explained in conjunction with elements from FIG. 1 and FIG. 2. With reference to FIG. 3, there is shown an exemplary execution pipeline 300. In the exemplary execution pipeline 300, there is shown a sequence of operations for video engagement determination based on statistical positional object tracking. The sequence of operations that may start from 302 and end at 316. The sequence of operations may be executed by the circuitry 202 of the electronic device 102.

At 302, media content (e.g., media content 302A) may be received. In at least one embodiment, the circuitry 202 may be configured to receive the media content 302A that may include a set of video frames. The reception of the media content 302A may be based on a content playability factor. For example, the received media content 302A may be a video content (i.e., the set of video frames) rendered on a display screen (such as a television screen). The rendered video content (i.e., the set of video frames) may be a pre-recorded video content (such as a television show or a movie). The circuitry 202 may receive the media content 302A from a device that may control the rendering of the set of video frames on the display screen. In another example, the received media content 302A may be a video content recording (in real-time or near-real-time) of a live performance event (such as a musical performance event, a news event, or a sporting event). The set of image capture devices 104A . . . 104N may be controlled to capture a set of video frames of the live performance event. Thereafter, the set of image capture devices 104A . . . 104N may transmit the captured set of video frames to the electronic device 102. The captured set of video frames of the live performance event may correspond to the set of video frames of the media content 302A received by the electronic device 102.

At 304, a set of objects (e.g., a set of objects 304A . . . 304N) included in the set of video frames may be detected. In at least one embodiment, the circuitry 202 may be configured to detect the set of objects 304A . . . 304N in the set of video frames. The circuitry 202 may apply the first NN model 110 on each video frame of the set of video frames (i.e., the media content 302A). The detection of the set of objects 304A . . . 304N, included in each video frame of the set of video frames, may be based on the application of the first NN model 110. In accordance with an embodiment, the circuitry 202 may be configured to identify, based on the application of the first NN model 110, each object of the detected set of objects 304A . . . 304N as a human character, an animated character, or an inanimate object.

In accordance with an embodiment, the circuitry 202 may be further configured to generate an embedding vector associated with each video frame of the set of video frames. The detection of the set of objects 304A . . . 304N, included in each video frame of the set of video frames, may be based on the generated embedding vector associated with the corresponding video frame. The generated embedding vector may include a set of components representative of features that may be detected in the corresponding video frame. The value of each component may depend on an outcome of detection of a feature in the corresponding frame. For example, the values of the components (i.e., the features) of the generated embedding vector may indicate whether an object (of the detected set of objects 304A . . . 304N) is detected and whether the detected object belongs to a class of human character, an animated character, or an inanimate object.

In accordance with an embodiment, the circuitry 202 may be further configured to determine, based on the identification of each object of the detected set of objects 304A . . . 304N (as a human character, an animated character, or an inanimate object), an association between at least one identified human character with at least one identified inanimate object. For example, the set of video frames (i.e., the media content 302A) may depict a live or a pre-recorded musical event. Based on an application of the first NN model 110 on the set of video frames of the musical event, object detection results may be generated. The object detection results may include the set of objects 304A . . . 304N and indicate an identification of human characters (such as, singers and musical instrument players), inanimate objects (such as musical instruments, microphones, and speakers), and association between the human characters and the inanimate objects. For example, the object detection results may include an identification that a singer or a guitarist (i.e., a human character) is playing (i.e., associated with) a guitar (i.e., an inanimate object).

In accordance with an embodiment, the circuitry 202 may be further configured to determine co-ordinates of each object of the detected set of objects 304A . . . 304N in each video frame of the set of video frames, based on the identification of each object of the detected set of objects 304A . . . 304N. The determination of the co-ordinates of each object may be based on a resolution of each video frame of the set of video frames. For example, once the detected objects of the set of objects 304A . . . 304N are identified, the location (i.e., the coordinates) of each detected object in each video frame (provided the corresponding object is detected in the corresponding video frame) may be determined. Thus, the object detection results (obtained an outputs of the first NN model 110) may include detection of each object of the set of objects 304A . . . 304N, the indication of a class of the corresponding object, and the determination of the coordinates (i.e., location) of the corresponding object in each video frame of the set of video frames where the corresponding object is detected.

The circuitry 202 may further determine, based on the determined co-ordinates of each object of the detected set of objects 304A . . . 304N, an interaction between at least two identified human characters. For example, two objects of the detected set of objects 304A . . . 304N may be identified (in at least one video frame of the set of video frames) as human characters. Thereafter, coordinates of each of the two human characters may be determined. Based on the determined coordinates, a distance between the two human characters may be determined. If the distance is less than a threshold, the circuitry 202 may determine that an interaction may be ongoing between the two identified human characters. In some scenarios, determination of the interaction, along with the distance, may be based on with detection of a movement of the lips and emotion of at least one of the two identified human characters in a subset of video frames of the set of video frames.

In accordance with an embodiment, the circuitry 202 may be further configured to determine a set of characteristics of speech that may be uttered by at least one human character (i.e., an object of the detected set of objects 304A . . . 304N) in the set of video frames. For the determination, an audio segment embedded in the set of video frames may be extracted. Thereafter, the circuitry 202 may apply a neural network model (such as, a recurrent neural network (RNN) model) on the extracted audio segment. Based on the application of the neural network model, the set of characteristics of speech may be determined. The determined set of characteristics of speech may include one or more of a loudness, a pitch, an intonation, an intensity of overtones, a voice modulation, a tone, a rate-of-speech, a voice quality, a timbre, a phonetic characteristics, a pronunciation, prosody, and one or more psychoacoustic characteristics. Based on the determined set of characteristics of the uttered speech, the at least one human character may be identified as a speaker or a protagonist in a scene that may be depicted in the set of video frames.

At 306, a set of images (e.g., a set of images 306A . . . 306N) of an audience watching the received media content 302A may be received. In at least one embodiment, the circuitry 202 may be configured to receive the set of images 306A . . . 306N of the audience watching the received media content 302A. The audience watching the received media content 302A may include a set of spectators. In a first example scenario, the audience (i.e., the set of spectators) may be watching the received media content 302A rendered on the display screen. The capturing of the set of images 306A . . . 306N may be synchronized with the rendering of the set of video frames (i.e., the received media content 302A) on the display screen. In a second example scenario, the audience (i.e., the set of spectators) may be watching the live performance event that may take place in a physical area, such as a stage. The set of image capture devices 104A . . . 104N may capture the set of video frames of the live performance event and transmit the set of video frames to the electronic device 102. The captured set of video frames of the live performance event may constitute the received media content 302A. The capturing of the set of images 306A . . . 306N may be synchronized with the capturing of the set of video frames of the live performance event. In accordance with an embodiment, the reception of the set of images 306A . . . 306N may be based on transmission of control instructions to the set of image capture devices 104A . . . 104N. Based on reception of the control instructions, the set of image capture devices 104A . . . 104N may capture the set of images 306A . . . 306N and transmit the received set of images 306A . . . 306N to the electronic device 102.

At 308, gaze coordinates associated with the audience may be estimated. In at least one embodiment, the circuitry 202 may be configured to estimate gaze co-ordinates associated with the audience based on the set of images 306A . . . 306N. For the estimation of the gaze co-ordinates, the circuitry 202 may apply the second NN model 112 on each image of the set of images 306A . . . 306N. Based on the application of the second NN model 112, the gaze co-ordinates may be estimated for each spectator of the audience for each image of the set of images 306A . . . 306N. The estimated gaze coordinates may constitute coordinates (i.e., a location) at which gaze of each spectator of the set of spectators (i.e., the audience) is directed during the rendering of each video frame of the set of media frames (i.e., the received media content 302A) on the display screen or the set of video frames captured from the live performance event. The gaze of each spectator in the audience may be directed to an object of the detected set of objects 304A . . . 304N during the rendering of each video frame or a performer (i.e., an object of the detected set of objects 304A . . . 304N) during the capturing of each video frame.

In the first example scenario, the gaze coordinates of each spectator may correspond to a first location of a first set of locations on the display screen on which the received media content 302A may be rendered. The circuitry 202 may detect an object of the detected set of objects 304A . . . 304N at each location of the first set of locations. In the second example scenario, the gaze coordinates of each spectator may correspond to a second location of a second set of locations. The second locations of the second set of locations may be locations within the physical area, i.e., the stage on which a live performance event may be taking place. The circuitry 202 may detect an object of the detected set of objects 304A . . . 304N at each location of the second set of locations.

In accordance with an embodiment, the circuitry 202 may be configured to (for both the first example scenario and the second example scenario) estimate a head pose of each spectator of the audience 118. The estimation may be based on the application of the second NN model 112 on each image of the set of images 306A . . . 306N. The estimated head pose of the corresponding spectator may vary across images of the set of images. The head pose, estimated for each spectator of the audience 118 based on each image, may be indicative of a direction towards which a head of the corresponding spectator may be directed at an instance when the corresponding image was captured (in case of a live (i.e., real-time) event) or rendered (in case of pre-recorded video). The circuitry 202 may be further configured to detect an iris position of each spectator of the audience based on the estimated head pose of the corresponding spectator. The detected iris position of each spectator may correspond to a position in physical space.

Once the iris position is detected, the circuitry 202 may be further configured to estimate a distance between the detected iris position and the detected set of objects 304A . . . 304N, based on the content playability factor associated with the received media content 302A. If the received media content 302A is rendered on the display screen (as per the first example scenario), then the estimated distance may correspond to distance between the detected iris position and a first location of the first set of locations on the display screen. An object of the detected set of objects 304A . . . 304N may be rendered at the first location on the display screen. The distance between the first location and the detected iris position may be lowest amongst distances between each of the other locations of the first set of locations and the detected iris position. The corresponding spectator may be gazing at the object rendered at the first location.

On the other hand, if the set of video frames of the live performance event (captured by the set of image capture devices 104A . . . 104N) constitutes the media content 302A (as per the second example scenario), then the estimated distance may correspond to distance between the detected iris position and a second location of the second set of locations. The distance between the second location and the detected iris position may be lowest amongst distances between each of the other locations of the second set of locations and the detected iris position. At least one object of the detected set of objects 304A . . . 304N (for example, a human character associated with an inanimate object) may be detected at the second location of the stage where the live performance event may be taking place. The corresponding spectator may be gazing at the human character performing at the second location of the stage using a musical instrument (i.e., the inanimate object).

The estimation of the gaze co-ordinates of the audience 118 (i.e., each spectator of the audience) may be, thus, based on the estimated head pose, the detected iris position, and the estimated distance. In accordance with an embodiment, the gaze coordinates of each spectator may correspond to coordinates of a location (such as, the first location) of the first set of locations or coordinates of a location (such as, the second location) of the second set of locations.

At 310, the received media content 302A may be split into a set of segments. In at least one embodiment, the circuitry 202 may be configured to split the received media content 302A into the set of segments. Each video frame of the set of video frames, included in the received media content 302A, may be split into the set of segments. The splitting may be such that a subset of segments of the set of segments of each video frame may include the detected set of objects 304A . . . 304N. Further, each segment of the subset of segments of each video frame may include one or more objects of the detected set of objects 304A . . . 304N. A count of segments in the set of segments may be based on a count of objects of the detected set of objects 304A . . . 304N that may be included in each segment of the subset of segments.

Thus, each video frame may be split such that a count of objects of the detected set of objects 304A . . . 304N included in each segment of the subset of segments is restricted to a predefined number (for example, one or two).

At 312, the estimated gaze coordinates may be mapped to the set of segments of each video frame of the set of video frames. In at least one embodiment, the circuitry 202 may be configured to map the estimated gaze co-ordinates to the set of segments of each video frame of the set of video frames. The mapping may be based on the content playability factor associated with the media content 302A. If the media content 302A is rendered on the display screen, then the gaze coordinates (estimated for each spectator of the audience during the rendering of each video frame on the display screen) and corresponding to coordinates of a first location of the first set of locations (in the display screen), may be mapped to coordinates of a location of the corresponding video frame. The circuitry 202, based on an outcome of the first NN model 110, may be configured to detect one or more objects of the detected set of objects 304A . . . 304N at the mapped location during the rendering of the corresponding video frame.

However, if the captured set of video frames of the live performance event constitutes the media content 302A, then the gaze coordinates (estimated for each spectator during the capturing of the live performance event) and corresponding to coordinates of a second location of the second set of locations (i.e., the physical area (stage) of the live performance event), may be mapped to coordinates of a location of the corresponding video frame. The circuitry 202, based on an outcome of the first NN model 110, may be configured to detect human characters, who may be associated with inanimate objects, performing at the mapped location. The identification of objects of the set of objects 304A . . . 304N as human characters or inanimate objects may be based on the outcome of the first NN model 110.

The coordinates of the corresponding video frame, to which the estimated gaze coordinates are mapped, for each of the first example scenario and the second example scenario, may belong to a segment of the set of segments into which the corresponding video frame may be split.

At 314, an engagement score, for each object of the detected set of objects 304A . . . 304N may be determined. In at least one embodiment, the circuitry 202 may be configured to determine the engagement score for each object of the detected set of objects 304A . . . 304N. The determination of the engagement score may be based on the mapping of the estimated gaze co-ordinates to the set of segments of each video frame of the set of video frames. The coordinates of each object of the detected set of objects 304A . . . 304N in each video frame of the set of video frames (determined based on object detection results obtained as outputs of the first NN model 110) may belong to a segment of the set of segments into which the corresponding video frame may be split. Thus, the engagement score for each object (such as the object 304A) may be determined based on mapping of the estimated gaze coordinates of each spectator of the audience to a segment of each video frame of the set of video frames to which coordinates of the object 304A may belong. The engagement score for an object of the detected set of objects 304A . . . 304N may increase if the estimated gaze coordinates associated with a majority of spectators of the audience are mapped to a segment, to which the object belongs, in a majority of video frames of the set of video frames. On the other hand, the engagement score for the object may reduce if the estimated gaze coordinates associated with a few spectators of the audience are mapped to the segment in a majority of video frames of the set of video frames.

For example, if the set of video frames includes ten video frames. The object 304A may be included in seven video frames. In each video frame, coordinates of the object 304A may belong to a segment of the set of segments into which the corresponding video frame may be split. The audience may include five spectators. Thus, five gaze coordinates may be estimated for each video frame. If the estimated gaze coordinates of the five spectators (i.e., the entire audience) is mapped to a segment of a first video frame (of the set of video frames) to which the object 304A belongs, the engagement score determined for the object 304A, for the first video frame, may be the highest. Similarly, the engagement score for the object 304A, for the first video frame, may be lower (or zero) if then estimated gaze coordinates of some (or none) of the spectators are mapped to the segment to which the object 304A belongs. Thus, the circuitry 202 may determine an engagement score for each object of the detected set of objects 304A . . . 304N for each video frame of the set of video frames.

In accordance with an embodiment, the circuitry 202 may be further configured to determine, for each video frame of the set of video frames, a strength associated with each object of the detected set of objects 304A . . . 304N based on a set of factors. The set of factors may be determined for each object in each video frame. The engagement score for each object of the detected set of objects 304A . . . 304N, for each video frame, may correspond to the determined strength of the corresponding object. The set of factors associated with the determination of the strength may include a first factor associated with an identification of the corresponding object (for example, the object 304A) as a human character or an animated character, a second factor indicative of an association of a first human character (i.e., the corresponding object, for example, the object 304A) with an inanimate object (for example, the object 304B) or with a second human character (for example, the object 304C), a third factor indicative of an identification of a human character (i.e., the corresponding object, for example, the object 304A) as a speaker, a fourth factor indicative of a gaze engagement associated with the corresponding object (for example, the object 304A), and a fifth factor indicative of an identification of an interaction between at least two objects (i.e., the corresponding object—for example, the object 304A and the object 304B) of the detected set of objects 304A . . . 304N.

The set of factors may be determined based on outcomes generated based on the application of the first NN model 110 on each video frame of the set of video frames and outcomes generated based on the application of the second NN model 112 on the set of captured images 306A . . . 306N. For example, the identification of the object 304A as a human character or an animated character, the identification of a human character (i.e., the object 304A) as a speaker, and identification of an interaction between at least two objects (i.e., the object 304A and the object 304B), may be determined based on the application of the first NN model 110 on the set of video frames included in the received media content 302A (as described further, for example, at 304).

The gaze engagement associated with an object may be determined based on the mapping of the estimated gaze coordinates associated with each spectator of the audience 118 to a segment, of each video frame of the set of video frames, to which the object may belong. The gaze coordinates may be estimated based on the application of the second NN model 112 on each image of the set of images

306A . . . 306N. In accordance with an embodiment, the gaze associated with an object (such as the object 304A) of the detected set of objects 304A . . . 304N may be determined based on a count of spectators for which the estimated gaze coordinates are mapped to a segment of each video frame of the set of frames that may include the object 304A and a count of spectators in the audience 118. For example, the audience may include ten spectators and estimated gaze engagement associated with five spectators may be mapped to coordinates that belong to a segment of a video frame of the set of video frames to which the object 304A may belong. In such scenario, the gaze engagement associated with the object 304A in the video frame may be a ratio of 5 and 10 (i.e., 0.5). Similarly, gaze engagement associated with the object 304A in each of the other video frames of the set of video frames, and gaze engagement associated with the other detected objects (i.e., objects 304B . . . 304N) in each video frame of the set of video frames may be determined.

In accordance with an embodiment, each factor of the set of factors may be associated with a weight. The circuitry 202 may determine a weight associated with each factor of the set of factors. The determined weight may be associated with a set of layers of the first NN model 110. Based on the determination of the set of factors, the weights of the set of layers of the first NN model 110 may be updated and the first NN model 110 may be retrained. For example, a weight associated with a first factor may increase if the object 304A is identified as a human character, compared to identification of the object 304A as an inanimate object. The weight associated with a second factor may increase if the first human character (i.e., the object 304A) is associated with the inanimate object (i.e., the object 304B) or with the second human character (i.e., the object 304C). The weight associated with a third factor may increase if the human character (i.e., the object 304A) is identified as a speaker. In some embodiments, the strength of the corresponding object (i.e., the object 304A) may be determined based on a weighed accumulation of the factors of the set of factors.

At 316, the determined engagement score, for each object of the detected set of objects 304A . . . 304N may be rendered on the display device 108. In at least one embodiment, the circuitry 202 may be configured to render, on the display device 108, the determined engagement score (for each video frame) for each object of the detected set of objects 304A . . . 304N. Based on such rendering, the user 120 may determine, in each video frame, objects of the detected set objects 304A . . . 304N in which majority of spectators of the audience may have engaged during the rendering of the set of video frames on the display screen, or the live performance event on the stage.

In accordance with an embodiment, the circuitry 202 may control the display device 108 to render the set of video frames on the display device 108. Based on an application of the first NN model 110 on the set of video frames, the circuitry 202 may detect personal information (such as date of birth, bank account details, address, and so on) in one or more segments of the set of segments associated with each video frame of the set of video frames (for example, a video content teaching a process to open a bank account online). On detection of the personal information, the circuitry 202 may mask the detected personal information from the set of segments.

Embodiments of the disclosure may enable leveraging ML models to determine a strength of an object or visual element (such as a human character or an animate object) in each video frame of a set of video frames, which may be received as media content. The strength may correspond to an engagement score which, in turn, may be indicative of interest of an audience in the object, amongst other objects, in each video frame when the audience is watching content depicted in the set of video frames. The set of video frames may be rendered on a display screen, or the set of video frames may be of a live performance event. Embodiments use an ML model to detect objects in each video frame of the set of video frames, identify the objects as human characters, animated characters, or as inanimate objects, identify interactions between human characters, identify human characters as speakers, identify speech characteristics of the human characters, detect personal information in the set of video frames, determine coordinates of the objects in the video frames, and so on.

Embodiments use another ML model to estimate gaze coordinates associated with the audience based on head pose, iris position, and distance between the iris position and the detected objects in the set of video frames. The head pose, the iris position, and the distance may be determined based on an input of a set of images of the audience to the second ML model. The gaze coordinates may indicate locations, on each rendered video frame of the set of video frames or the physical locations, where each spectator of the audience may be gazing. Embodiments may determine an engagement score for each detected object in each video frame based on outcomes of the ML models. The engagement score, determined for each object, may indicate an interest of the audience in the corresponding object. Based on the interest the objects detected in the set of video frames may be ranked. The determined engagement scores of the objects may be used for rating video content (i.e., the set of video frames), which may be associated with a movie, a series, or a live performance event, and in-video advertising for brand endorsements. Further, the determined engagement scores may be used for creation of one or more metadata tags, and, subsequent, metadata tagging of the video content. As the determined engagement scores may be objective scores to rank objects in video content, metadata tagging performed based on the determined engagement scores may be less time-consuming and more accurate.

Figure 4:
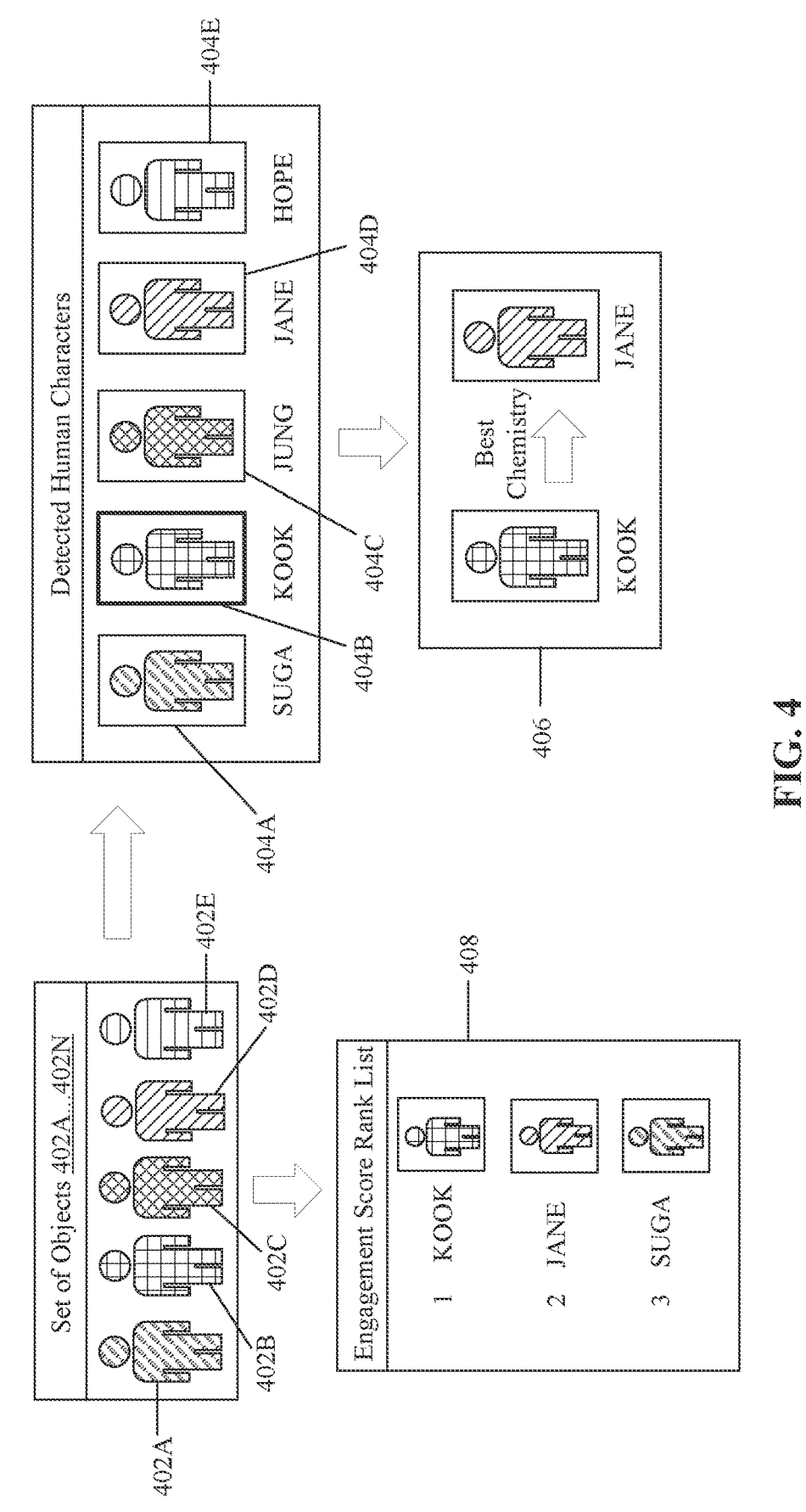
FIG. 4 is a diagram that illustrates an exemplary scenario for rendering of information associated with detection of objects in media content and engagement of an audience in the detected objects, in accordance with an embodiment of the disclosure.

FIG. 4 is a diagram that illustrates an exemplary scenario for rendering of information associated with detection of objects in media content and engagement of an audience in the detected objects, in accordance with an embodiment of the disclosure. FIG. 4 is explained in conjunction with elements from FIG. 1, FIG. 2, and FIG. 3. With reference to FIG. 4, there is shown an exemplary scenario 400. In the exemplary scenario 400, there is shown a set of objects (i.e., human characters) 402A . . . 402E. The circuitry 202 may receive media content that includes a set of video frames of a live performance event. The set of human characters may be performing in the live performance event. The set of image capture devices 104A . . . 104N may capture the set of video frames of the live performance event and transmit the captured set of video frames to the electronic device 102 as the media content. There is further shown, a set of object detection results that may include detection of the set of objects 402A . . . 402E, identification of each object of the set of objects 402A . . . 402E as a human character, ranking of detected objects based on engagement scores associated with the objects, and identification of interactions between the objects.

In accordance with an embodiment, the circuitry 202 may be configured to apply the first NN model 110 on each video frame of the set of video frames. Based on the application, five objects, i.e., the set of objects 402A . . . 402E, may be detected. Further, each detected object may be identified as a human character. For example, the object 402A may be identified as "Suga". Similarly, the objects 402B, 402C, 402D, and 402E, may be identified as "Kook", "Jung", "Jane", and "Hope". In an example, a facial recognition model (including, for example, a deep learning model) may be applied on the detected set of objects 402A . . . 402E to identify the detected set of objects 402A . . . 402E.

In accordance with an embodiment, the circuitry 202 may be configured to control the display device 108 to render, on a user interface, the detected set of objects 402A . . . 402E identified as human characters. The detected set of objects 402A . . . 402E may be rendered as user interface elements 404A . . . 404E, which may be configured to receive user inputs from a user (such as the user 120). For example, a user input may be received via the user interface elements 404B. The user input may be indicative of a selection of the object 402B, i.e., the human character "Kook".

Based on the reception of the user input, the circuitry 202 may control the display device 108 to render an object detection result 406. The object detection result 406 may be obtained based on the application of the first NN model 110 on each video frame of the set of video frames. The object detection result 406 may indicate that the object 402B, i.e., the human character "Kook", had primarily interacted with the object 402D, i.e., the human character "Jane". The indication may be based on identification of interactions between the object 402B and the other objects (i.e., the human characters "Suga", "Jung", "Jane", and "Hope"), determination of an interaction of the object 402B and the object 402D in a majority of video frames of the set of video frames, and an identification of the at least one of the object 402B and the object 402D as a speaker.

In accordance with an embodiment, the circuitry 202 may be configured to control the display device 108 to render an engagement score rank-list 408, which may indicate top-ranked objects of the set of objects 402A . . . 402E, which may be associated with the highest engagement scores, amongst other detected objects. The circuitry 202 may determine an engagement score for each object of the set of objects 402A . . . 402E based on gaze coordinates associated with an audience watching the live performance event. The gaze coordinates may be mapped to coordinates of locations in one or more video frames of the set of video frames, where the set of objects 402A . . . 402E may be detected. A higher engagement score for an object may indicate a mapping of the gaze coordinates associated with a majority of spectators of the audience to locations, in a majority of video frames of the set of video frames, where the object may be detected. The engagement score rank-list 408 may indicate that a determined engagement score for the object 402B (i.e., the human character "Kook") may be highest, followed by that determined for the objects 402D (i.e., the human character "Jane") and 402A (i.e., the human character "Suga").

It should be noted that the scenario 400 of FIG. 4 is for exemplary purposes and should not be construed to limit the scope of the disclosure.

Figure 5:
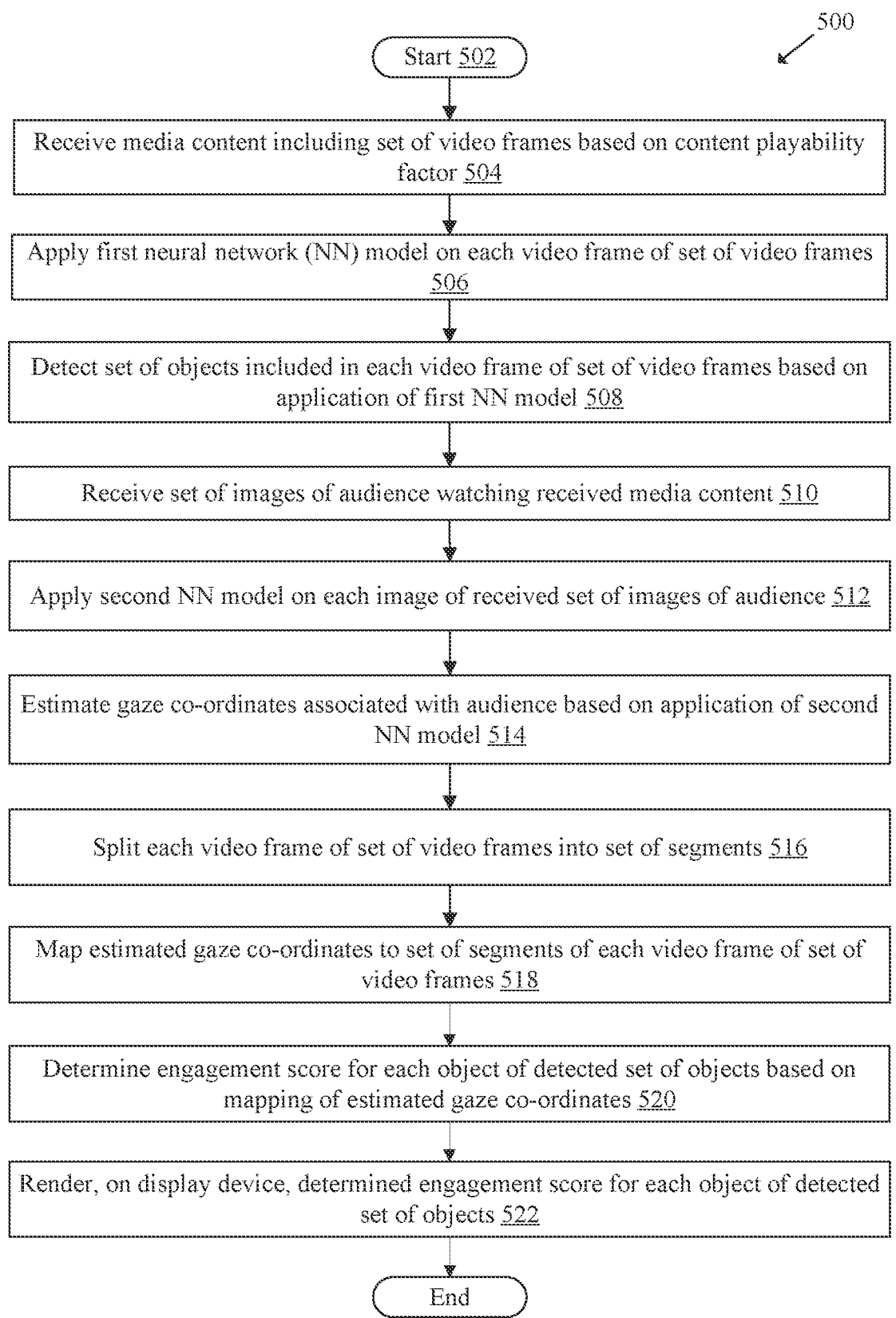
FIG. 5 is a flowchart that illustrates operations for an exemplary method for video engagement determination based on statistical positional object tracking, in accordance with an embodiment of the disclosure.

FIG. 5 is a flowchart that illustrates operations for an exemplary method for video engagement determination based on statistical positional object tracking, in accordance with an embodiment of the disclosure. FIG. 5 is explained in conjunction with elements from FIG. 1, FIG. 2, FIG. 3, and FIG. 4. With reference to FIG. 5, there is shown a flowchart 500. The operations from 502 to 522 may be implemented by any computing system, such as, by the electronic device 102, or the circuitry 202 of the electronic device 102, of FIG. 1. The operations may start at 502 and may proceed to 504.

At 504, media content including a set of video frames may be received based on a content playability factor. In at least one embodiment, the circuitry 202 may be configured to receive the media content including the set of video frames based on the content playability factor. The details of reception of the media content, is described, for example, in FIG. 1 and FIG. 3.

At 506, the first NN model 110 may be applied on each video frame of the set of video frames. In at least one embodiment, the circuitry 202 may be configured to apply the first NN model 110 on each video frame of the set of video frames. The details of application of the first NN model 110 on each video frame of the set of video frames, is described, for example, in FIG. 1 and FIG. 3.

At 508, the set of objects 116A . . . 116N included in each video frame of the set of video frames may be detected based on the application of the first NN model 110. In at least one embodiment, the circuitry 202 may be configured to detect the set of objects 116A . . . 116N included in each video frame of the set of video frames based on the application of the first NN model 110 on each video frame of the set of video frames. The details of detection of the set of objects, is described, for example, in FIG. 1 and FIG. 3.

At 510, a set of images of the audience 118 watching the received media content may be received. In at least one embodiment, the circuitry 202 may be configured to receive the set of images of the audience 118 watching the received media content from the set of image capture devices 104A . . . 104N. The details of the reception of the set of images, are described, for example, in FIG. 1 and FIG. 3.

At 512, the second NN model 112 may be applied on each image of the received set of images of the audience 118. In at least one embodiment, the circuitry 202 may be configured to apply the second NN model 112 on each image of the received set of images of the audience 118. The details of application of the second NN model 112, are described, for example, FIG. 1 and FIG. 3.

At 514, gaze co-ordinates associated with the audience 118 may be estimated based on the application of the second NN model 112. In at least one embodiment, the circuitry 202 may be configured to estimate the gaze co-ordinates associated with the audience 118 based on the application of the second NN model 112 on the received set of images of the audience 118. The details of the estimation of the gaze co-ordinates associated with the audience 118, are described, for example, in FIG. 1 and FIG. 3.

At 516, each video frame of the set of video frames may be split into a set of segments. In at least one embodiment, the circuitry 202 may be configured to split each video frame of the set of video frames into the set of segments. The details of splitting of each video frame of the set of video frames into the set of segments, are described, for example, in FIG. 1 and FIG. 3.

At 518, the estimated gaze co-ordinates may be mapped to the set of segments of each video frame of the set of video frames. In at least one embodiment, the circuitry 202 may be configured to map the estimated gaze co-ordinates to the set of segments of each video frame of the set of video frames. The details of mapping of the estimated gaze co-ordinates to the set of segments are described, for example, in FIG. 1 and FIG. 3.

At 520, an engagement score, for each object of the detected set of objects 116A . . . 116N, may be determined, based on the mapping of the estimated gaze co-ordinates. In at least one embodiment, the circuitry 202 may be configured to determine the engagement score for each object of the detected set of objects 116A . . . 116N based on the mapping of the estimated gaze co-ordinates. The details of determination of the engagement score for each object are described, for example, in FIG. 1 and FIG. 3.

At 522, the determined engagement score for each object of the detected set of objects 116A . . . 116N may be rendered on a display device (such as the display device 108). In at least one embodiment, the circuitry 202 may be configured to render, on the display device 108, the determined engagement score for each object of the detected set of objects 116A . . . 116N. The details of rendering of the engagement score are described, for example, in FIG. 1 and FIG. 3. Control may pass to end.

Although the flowchart 500 is illustrated as discrete operations, such as 504, 506, 508, 510, 512, 514, 516, 518, 520, and 522, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include reception of media content including a set of video frames based on a content playability factor. The operations may further include application of a first neural network (NN) model (e.g., the first NN model 110) on each video frame of the set of video frames. The operations may further include detection of a set of objects (e.g., the set of objects 116A . . . 116N) included in each video frame of the set of video frames based on the application of the first NN model 110. The operations may further include reception of a set of images of an audience (e.g., the audience 118) watching the received media content. The operations may further include application of a second NN model (e.g., the second NN model 112) on each image of the received set of images of the audience 118. The operations may further include estimation of gaze co-ordinates associated with the audience 118 based on the application of the second NN model 112. The operations may further include splitting of each video frame of the set of video frames into a set of segments. The operations may further include mapping of the estimated gaze co-ordinates to the set of segments of each video frame of the set of video frames. The operations may further include determination of an engagement score for each object of the detected set of objects 116A . . . 116N based on the mapping of the estimated gaze co-ordinates. The operations may further include rendering, on a display device (e.g., the display device 108), the determined engagement score for each object of the detected set of objects 116A . . . 116N.

Exemplary aspects of the disclosure may include an electronic device (such as, the electronic device 102 of FIG. 1) that may include circuitry (such as the circuitry 202. The electronic device 102 may further include memory (such as the memory 204 of FIG. 2) that may be configured to store the first NN model 110 and the second NN model 112. The circuitry 202 may be configured to receive media content including a set of video frames based on a content playability factor. The received media content may correspond to one of a live video content recording of a live performance event or a pre-recorded video content. The set of video frames may be received from a set of image capture devices (e.g., the set of image capture devices 104A . . . 104N) that may capture a live performance event. The circuitry 202 may be further configured to apply the first NN model 110 on each video frame of the set of video frames. The circuitry 202 may be further configured to detect the set of objects 116A . . . 116N included in each video frame of the set of video frames based on the application of the first NN model 110. The circuitry 202 may be further configured to receive a set of images of the audience 118 watching the received media content. The circuitry 202 may be further configured to apply the second NN model 112 on each image of the received set of images of the audience 118. The circuitry 202 may be further configured to estimate gaze co-ordinates associated with the audience 118 based on the application of the second NN model 112. The circuitry 202 may be further configured to split each video frame of the set of video frames into a set of segments. The circuitry 202 may be further configured to map the estimated gaze co-ordinates to the set of segments of each video frame of the set of video frames. The circuitry 202 may be further configured to determine an engagement score for each object of the detected set of objects 116A . . . 116N based on the mapping of the estimated gaze co-ordinates. The circuitry 202 may be further configured to render, on the display device 108, the determined engagement score for each object of the detected set of objects 116A . . . 116N.

In accordance with an embodiment, the circuitry 202 may be further configured to generate an embedding vector associated with each video frame of the set of video frames. The detection of the set of objects 116A . . . 116N included in each video frame of the set of video frames may be based on the generated embedding vector associated with the corresponding video frame.

In accordance with an embodiment, the circuitry 202 may be further configured to identify, based on the application of the first NN model 110, each object of the detected set of objects 116A . . . 116N as one of a human character, an animated character, or an inanimate object. The circuitry may be further configured to determine, based on the identification of each object of the detected set of objects 116A . . . 116N, an association between at least one identified human character with at least one identified inanimate object.

In accordance with an embodiment, the circuitry 202 may be further configured to determine co-ordinates of each object of the detected set of objects 116A . . . 116N in each video frame of the set of video frames, based on the identification of each object of the detected set of objects 116A . . . 116N. The circuitry 202 may be further configured to determine, based on the determined co-ordinates, an interaction between at least two identified human characters.

In accordance with an embodiment, the circuitry 202 may be further configured to determine a set of characteristics of speech uttered by at least one human character in the set of video frames. The circuitry 202 may be further configured to identify, based on the determined set of characteristics, the at least one identified human character as a speaker in the set of video frames.

In accordance with an embodiment, the circuitry 202 may be further configured to estimate a head pose of each spectator of the audience 118 based on the application of the second NN model 112. The circuitry 202 may be further configured to detect an iris position of each spectator of the audience 118 based on the estimated head pose of the corresponding spectator. The circuitry 202 may be further configured to estimate of a distance between the detected iris position and the detected set of objects 116A . . . 116N, based on the content playability factor associated with the received media content. The estimation of the gaze co-ordinates of the audience 118 may be further based on the estimated head pose, the detected iris position, and the estimated distance.

In accordance with an embodiment, the circuitry 202 may be further configured to determine a strength associated with each object of the set of objects 116A . . . 116N based on a set of factors. The engagement score for each object of the detected set of objects 116A . . . 116N may correspond to the determined strength of the corresponding object. The set of factors associated with the determination of the strength may include at least one of an identification of a corresponding object as a human character or an animated character, an association of a first human character with an inanimate object or with a second human character, an identification of a human character as a speaker, a gaze engagement associated with the corresponding object, and an identification of an interaction between at least two objects of the set of objects 116A . . . 116N.

In accordance with an embodiment, the circuitry 202 may be further configured to determine a weight associated with each factor of the set of factors. The determined weight may be further associated with a set of layers of the first NN model 110.

In accordance with an embodiment, the circuitry 202 may be further configured to detect personal information rendered in one or more segments of the set of segments associated with each video frame of the set of video frames. The circuitry 202 may be further configured to mask the detected personal information from the set of segments. The detection of the personal information is based on the application of the first NN model 110.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other device adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
circuitry configured to:
    receive media content including a set of video frames based on a content playability factor;
    apply a first neural network (NN) model on each video frame of the set of video frames;
    detect a set of objects included in each video frame of the set of video frames based on the application of the first NN model;
    receive a set of images of an audience that watches the received media content;
    apply a second NN model on each image of the received set of images of the audience;
    estimate gaze co-ordinates associated with the audience based on the application of the second NN model;
    split the each video frame of the set of video frames into a set of segments;
    map the estimated gaze co-ordinates to the set of segments of the each video frame of the set of video frames;
    determine an engagement score for each object of the detected set of objects based on the mapping of the estimated gaze co-ordinates; and
    render, on a display device, the determined engagement score for the each object of the detected set of objects.

2. The electronic device according to claim 1, wherein the circuitry is further configured to:
    generate an embedding vector associated with the each video frame of the set of video frames, wherein
        the detection of the set of objects included in the each video frame of the set of video frames is further based on the generated embedding vector associated with a corresponding video frame of the set of video frames.

3. The electronic device according to claim 1, wherein the circuitry is further configured to:
    identify, based on the application of the first NN model, the each object of the detected set of objects as one of a class of human characters, a class of animated characters, or a class of inanimate objects; and
    determine, based on the identification of the each object of the detected set of objects, an association between at least one human character of the class of human characters with at least one inanimate object of the class of inanimate objects.

4. The electronic device according to claim 3, wherein the circuitry is further configured to:
    determine co-ordinates of the each object of the detected set of objects in the each video frame of the set of video frames, based on the identification of the each object of the detected set of objects; and
    determine, based on the determined co-ordinates, an interaction between at least two human characters of the class of human characters.

5. The electronic device according to claim 3, wherein the circuitry is further configured to:
    determine a set of characteristics of speech uttered by the at least one human character in the set of video frames; and
    identify, based on the determined set of characteristics, the at least one human character as a speaker in the set of video frames.

6. The electronic device according to claim 1, wherein the circuitry is further configured to:
    estimate a head pose of each spectator of the audience based on the application of the second NN model;
    detect an iris position of the each spectator of the audience based on the estimated head pose of a corresponding spectator of the audience; and
    estimate a distance between the detected iris position and the detected set of objects, based on the content playability factor associated with the received media content, wherein
        the estimation of the gaze co-ordinates of the audience is further based on the estimated head pose, the detected iris position, and the estimated distance.

7. The electronic device according to claim 1, wherein the circuitry is further configured to:
    determine a strength associated with the each object of the set of objects based on a set of factors, wherein
        the engagement score for the each object of the detected set of objects corresponds to the determined strength of a corresponding object of the set of objects.

8. The electronic device according to claim 7, wherein the set of factors associated with the determination of the strength includes at least one of:
    an identification of the corresponding object as a first human character of a class of human characters or an animated character of a class of animated characters,
    an association of the first human character with an inanimate object of a class of inanimate objects or with a second human character of the class of human characters,
    an identification of the first human character as a speaker,
    a gaze engagement associated with the corresponding object, or
    an identification of an interaction between at least two objects of the set of objects.

9. The electronic device according to claim 7, wherein the circuitry is further configured to:
    determine a weight associated with each factor of the set of factors, wherein
        the determined weight is further associated with a set of layers of the first NN model.

10. The electronic device according to claim 1, wherein the received media content corresponds to one of a live video content recording of a live performance event or a pre-recorded video content.

11. The electronic device according to claim 1, wherein the set of video frames is received from a set of image capture devices that captures a live performance event.

12. The electronic device according to claim 1, wherein the circuitry is further configured to:
    detect personal information rendered in at least one segment of the set of segments associated with the each video frame of the set of video frames; and
    mask the detected personal information from the set of segments.

13. The electronic device according to claim 12, wherein the detection of the personal information is based on the application of the first NN model.

14. A method, comprising:
in an electronic device:
    receiving media content including a set of video frames based on a content playability factor;
    applying a first neural network (NN) model on each video frame of the set of video frames;

detecting a set of objects included in the each video frame of the set of video frames based on the application of the first NN model;

receiving a set of images of an audience watching the received media content;

applying a second NN model on each image of the received set of images of the audience;

estimating gaze co-ordinates associated with the audience based on the application of the second NN model;

splitting the each video frame of the set of video frames into a set of segments;

mapping the estimated gaze co-ordinates to the set of segments of the each video frame of the set of video frames;

determining an engagement score for each object of the detected set of objects based on the mapping of the estimated gaze co-ordinates; and rendering, on a display device, the determined engagement score for the each object of the detected set of objects.

15. The method according to claim 14, further comprising:

identifying, based on the application of the first NN model, the each object of the detected set of objects as one of a class of human characters, a class of animated characters, or a class of inanimate objects; and determining, based on the identification of the each object of the detected set of objects, an association between at least one human character of the class of human characters with at least one inanimate object of the class of inanimate objects.

16. The method according to claim 15, further comprising:

determining co-ordinates of the each object of the detected set of objects in the each video frame of the set of video frames, based on the identification of the each object of the detected set of objects; and determining, based on the determined co-ordinates, an interaction between at least two human characters of the class of human characters.

17. The method according to claim 15, further comprising:

determining a set of characteristics of speech uttered by the at least one human character in the set of video frames; and identifying, based on the determined set of characteristics, the at least one human character as a speaker in the set of video frames.

18. The method according to claim 14, further comprising:

estimating a head pose of each spectator of the audience based on the application of the second NN model;

detecting an iris position of the each spectator of the audience based on the estimated head pose of a corresponding spectator of the audience; and estimating a distance between the detected iris position and the detected set of objects, based on the content playability factor associated with the received media content, wherein the estimation of the gaze co-ordinates of the audience is further based on the estimated head pose, the detected iris position, and the estimated distance.

19. The method according to claim 14, further comprising:

determining a strength associated with the each object of the set of objects based on a set of factors, wherein the engagement score for the each object of the detected set of objects corresponds to the determined strength of the corresponding object.

20. A non-transitory computer-readable medium having stored thereon, computer-executable instructions that when executed by an electronic device, causes the electronic device to execute operations, the operations comprising:

receiving media content including a set of video frames based on a content playability factor;

applying a first neural network (NN) model on each video frame of the set of video frames;

detecting a set of objects included in the each video frame of the set of video frames based on the application of the first NN model;

receiving a set of images of an audience watching the received media content;

applying a second NN model on each image of the received set of images of the audience;

estimating gaze co-ordinates associated with the audience based on the application of the second NN model;

splitting the each video frame of the set of video frames into a set of segments;

mapping the estimated gaze co-ordinates to the set of segments of the each video frame of the set of video frames;

determining an engagement score for each object of the detected set of objects based on the mapping of the estimated gaze co-ordinates; and rendering, on a display device, the determined engagement score for the each object of the detected set of objects.

* * * * *